(12) United States Patent
Luna

(10) Patent No.: US 10,100,475 B1
(45) Date of Patent: Oct. 16, 2018

(54) ANIMAL DEFECATION COLLECTION APPARATUS

(71) Applicant: Jose Antonio Luna, West Covina, CA (US)

(72) Inventor: Jose Antonio Luna, West Covina, CA (US)

(*) Notice: Subject to any disclaimer, the term of this patent is extended or adjusted under 35 U.S.C. 154(b) by 0 days.

(21) Appl. No.: 15/895,995

(22) Filed: Feb. 13, 2018

(51) Int. Cl.
  *B65G 7/12* (2006.01)
  *E01H 1/12* (2006.01)
  *A01K 1/01* (2006.01)

(52) U.S. Cl.
  CPC .............. *E01H 1/1206* (2013.01); *A01K 1/01* (2013.01)

(58) Field of Classification Search
  CPC ............................ E01H 1/1206; A01K 23/005
  USPC ................... 294/1.3, 1.4, 1.5, 16, 99.1, 99.2
  See application file for complete search history.

(56) References Cited

U.S. PATENT DOCUMENTS

| | | | |
|---|---|---|---|
| 3,879,079 A | 4/1975 | Nicholas | |
| D240,838 S * | 8/1976 | Nitu | 294/1.3 |
| 5,186,506 A * | 2/1993 | Gale | E01H 1/1206 294/1.3 |
| 5,385,376 A * | 1/1995 | Malaspina | E01H 1/1206 15/257.6 |
| 5,620,220 A | 4/1997 | Khoshnood | |
| D405,565 S | 2/1999 | Price | |
| 5,876,079 A * | 3/1999 | Rycroft | E01H 1/1206 294/1.3 |
| 6,059,333 A | 5/2000 | De Toma | |
| 6,086,123 A * | 7/2000 | Sowinski | E01H 1/1206 294/1.3 |
| D530,459 S | 10/2006 | White | |
| 8,177,270 B2 | 5/2012 | Chen | |
| 8,292,338 B1 * | 10/2012 | Baghdasaryan | E01H 1/1206 294/1.3 |
| D676,201 S | 2/2013 | Browne | |
| 9,546,460 B1 | 1/2017 | Nicol | |
| 9,556,570 B1 | 1/2017 | Wawrzynowsi | |
| 2005/0212313 A1 | 9/2005 | Hong | |
| 2010/0013251 A1 | 1/2010 | Shia | |
| 2011/0193359 A1 | 8/2011 | Howard | |
| 2016/0298305 A1 | 10/2016 | Baker | |

FOREIGN PATENT DOCUMENTS

| | | |
|---|---|---|
| DE | 10210691 | 9/2003 |
| GB | 2420266 | 5/2006 |
| JP | 3209846 U | 3/2017 |

* cited by examiner

*Primary Examiner* — Paul T Chin

(74) *Attorney, Agent, or Firm* — Thomas I. Rozsa

(57) ABSTRACT

An apparatus for the collection of animal feces utilizing two oppositely disposed arms which are used to sweep and collect feces and allow a user to more easily collect feces into a standard sized collection bag without touching the feces or feeling the texture of the feces through a bag. The apparatus further has either a sweeper or a dust pan at a distal location of the arms to perform the function of collecting the feces when the apparatus arms are squeezed together. During non use, the animal defecation collection apparatus has a collapsible sweeper blade and collapsible dust pan blade that fold and allow the apparatus to be more compact when stored. Further, there is a locking mechanism to allow the arms to be retained together to be more compact during storage.

2 Claims, 28 Drawing Sheets

ANIMAL DEFECATION COLLECTION APPARATUS

BACKGROUND OF THE INVENTION

1. Field of the Invention

The field of the invention relates to pet products. Specifically, the present invention relates to tools used to clean up pet feces.

2. Description of the Prior Art

The following sixteen patents and published patent applications are the closest prior art known to the inventor.
1. U.S. Design Pat. No. D676,201 issued to Robbie Browne on Feb. 12, 2013 for "Pet Waste Pickup Device".
2. U.S. Design Pat. No. D530,459 issued to Esther Catherine White on Oct. 17, 2006 for "Pet Waste Retrieval And Disposal Tool".
3. U.S. Design Pat. No. D405,565 issued to Mary L. Price on Feb. 9, 1999 for "Tool For Picking Up Dog Excreta".
4. United States Published Patent Application No. US 2016/0298305 to Cheryl Davidson Baker and published on Oct. 13, 2016 for "Touchless Disposable Pet Feces Device".
5. United States Published Patent Application No. US 2011/0193359 to Vincent Howard and published on Aug. 11, 2011 for "Portable Pet Waste Removal Device".
6. United States Published Patent Application No. US 2010/0013251 to Dr. Banger Shia and published on Jan. 21, 2010 for "Dejecta Collector For Pets".
7. United States Published Patent Application No. US 2005/0212313 to Thomas K. Hong and published on Sep. 29, 2005 for "Picking Up And Bagging Animal Excrement".
8. U.S. Pat. No. 9,556,570 B1 issued to Michael Wawrzynowski on Jan. 31, 2017 for "Device for Picking Up Animal Waste".
9. U.S. Pat. No. 9,546,460 B1 issued to Charles Nicol on Jan. 17, 2017 for "Dog Feces Collection Device".
10. U.S. Pat. No. 8,177,270 B2 issued to Mun Seng Chen on May 15, 2012 for "Dog Feces Collecting Device And Method Of Use Thereof".
11. U.S. Pat. No. 6,059,333 B1 issued to Michele De Toma on May 9, 2000 for "Device For The Picking Up Of Canine Excrement".
12. U.S. Pat. No. 5,620,220 issued to Bahram Khoshnood on Apr. 15, 1997 for "Sanitary Waste Collector".
13. U.S. Pat. No. 3,879,079 issued to William Nicholas on Apr. 22, 1975 for "Solid Waste Container".
14. United Kingdom Patent Application No. GB2420266 issued to Kathleen Conway on May 24, 2006 for "Canine Excrement Pick-up and Disposal Device".
15. Japanese Patent No. JP3209846U issued on Mar. 22, 2017 for "A Dog Feces Collecting Device".
16. German Patent No. DE10210691A1 issued to Otto Thiesler on Sep. 9, 2003 for "Tongs for Picking up Dog Feces".

SUMMARY OF THE INVENTION

The present invention is an animal defecation collection apparatus having two oppositely disposed arms which are used to sweep and collect feces.

It is an object of the present invention to includes two feces collection arms; a first arm having a first proximal end and a first distal end, and a second arm having a second proximal end and a second distal end. The first arm is also referred to as a left arm. The second arm is also referred to as a right arm.

It is also an object of the present invention for each arm having a proximal end rotatably with each respective arm having a distal end with either a sweeper portion or a dustpan portion to perform the function of collecting the feces when the apparatus arms are squeezed together.

It is also an object of the present invention to provide an animal defecation collection apparatus that have collapsible sweeper and dust pan portions that allow the apparatus to be more compact when stored.

It is an additional object of the present invention to provide a locking mechanism to allow the arms to be retained together and remain compact during storage.

It is a further object of the present invention to provide stoppers on each of the arms at a location distal from the grasping portion to prevent over rotation of the sweeper member and dust pan member.

It is a further object of the present invention to provide a spring member near the upper grasping handles of the apparatus to force the arms to spread apart when a user is not pressing the arms together by use of the grasping handles.

It is still a further object of the present invention to provide a left arm having the sweeper portion or sweeper blade that is slightly shorter than the right arm having the dust pan member to more efficiently sweep the feces because the sweeper will not touch the ground but come in close contact with the ground during the feces collection operation.

It is still a further object of the present invention to provide a scalloped edge on the sweeper member to improve collection over surfaces where the feces is on grass.

It is still a further object of the present invention to provide an oval shaped opening above the grasping handles to allow the apparatus to be hung from a wall or similar structure during storage.

To facilitate use, there are two embodiments of the present invention, a first embodiment for use by a right handed person and a second embodiment for use by a left handed person. The second embodiment has components which are a reverse of the first embodiment. Either embodiment can be used by both a right handed person and a left handed person but the first embodiment is easier for a right handed person to use and the second embodiment is easier for a left handed person to use.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

The drawings and text in this patent application describe an animal defecation apparatus when used by a right handed person and by a left handed person. In this application, the first embodiment and the right handed embodiment are the same and the terms are used interchangeably. Similarly in this application, the second embodiment and the left handed embodiment are the same and the terms are used interchangeably In the second embodiment, the components are the reverse from the first embodiment.

The views in FIG. 1-6 are described from a point of view of a person holding the present invention in the person's right hand as the person is looking from a right side, rear and top view of the present invention in front of the person.

Figure 1:
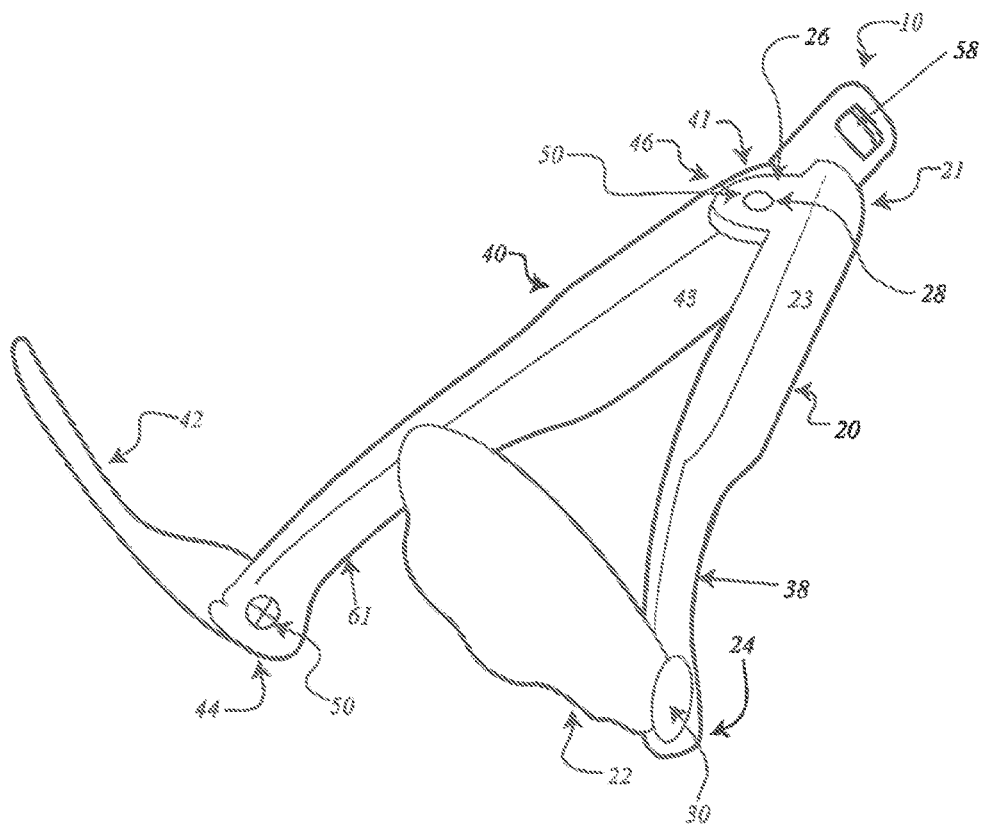
Figure 2A:
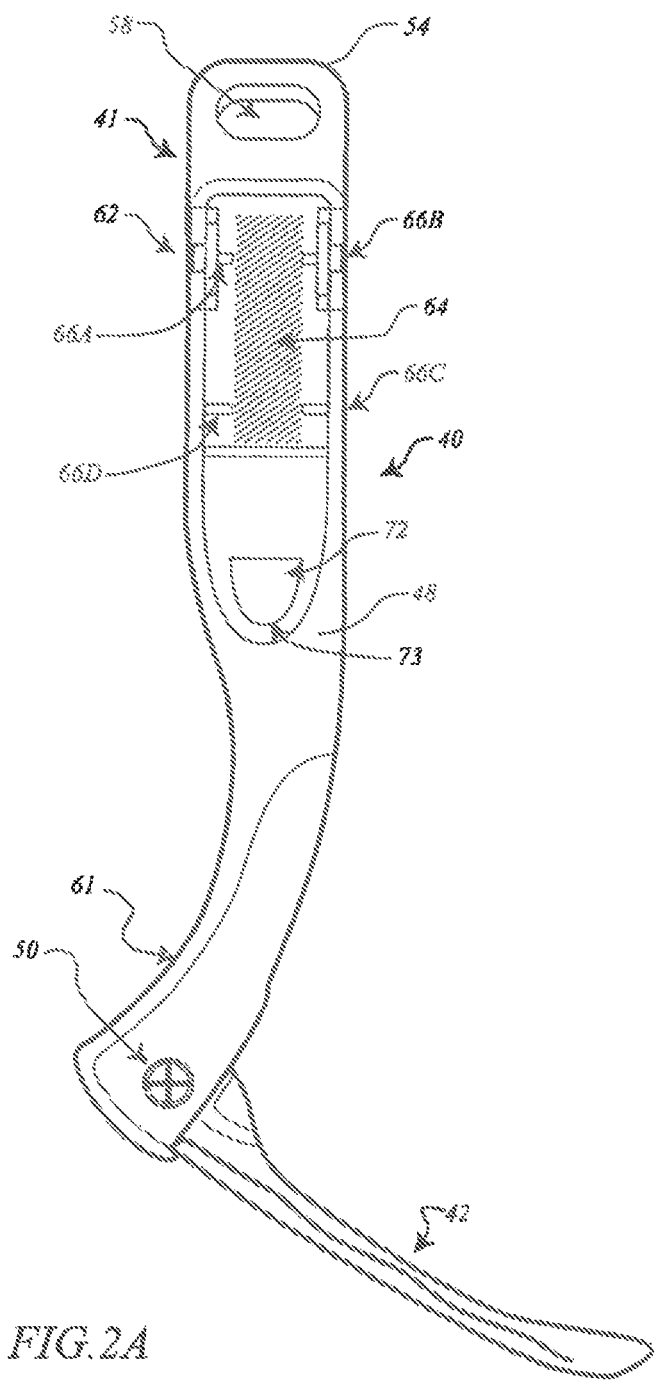
Figure 2B:
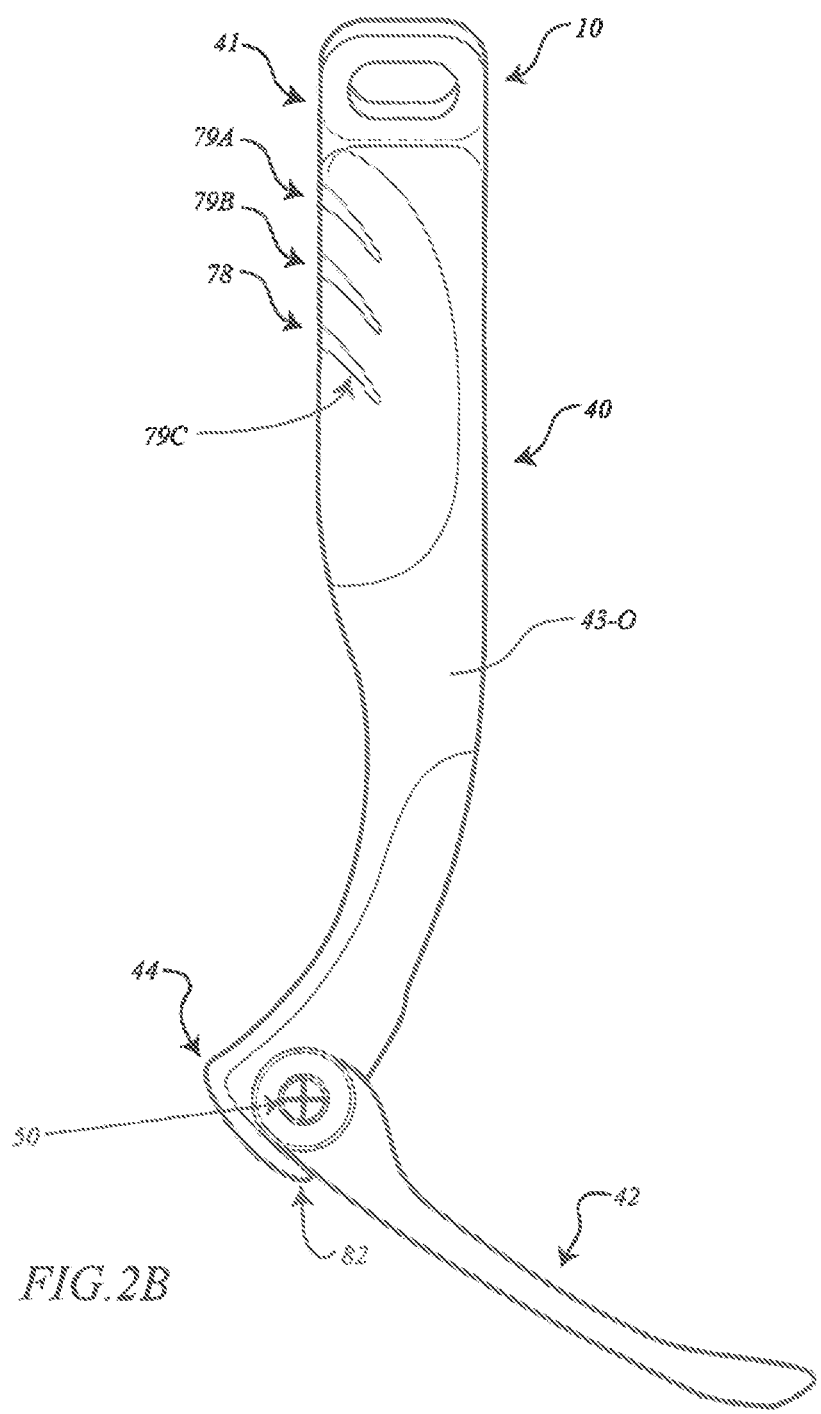
Figure 2C:
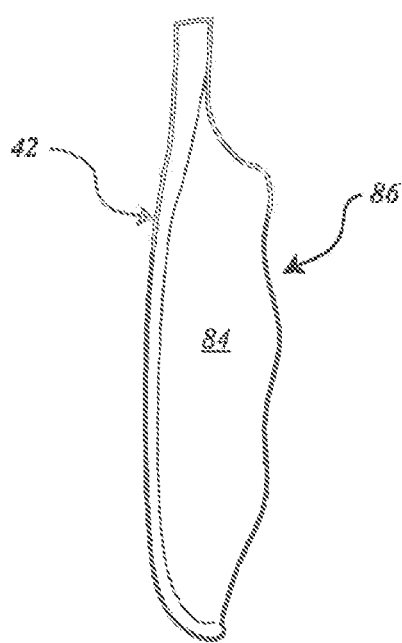
Figure 3A:
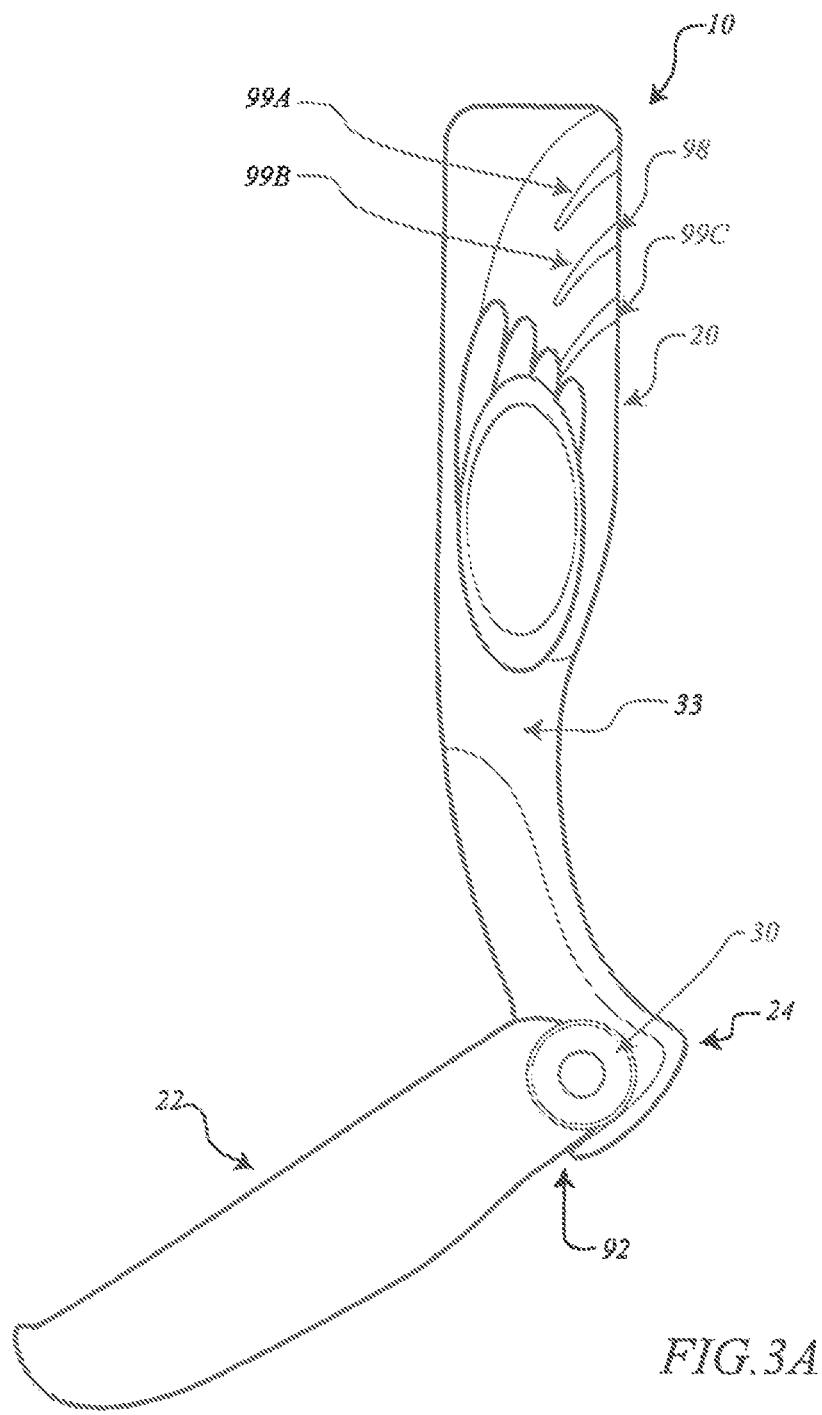
Figure 3B:
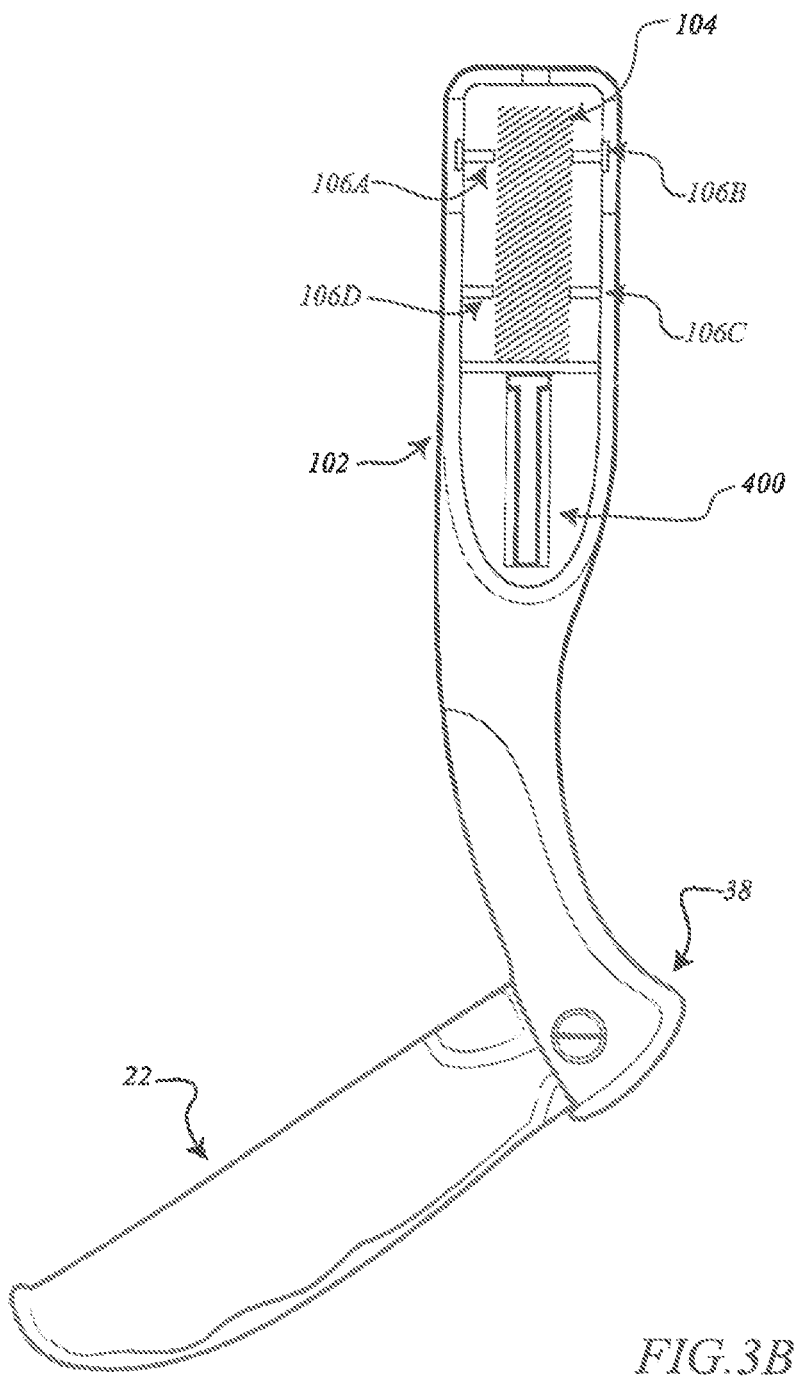
Figure 3C:
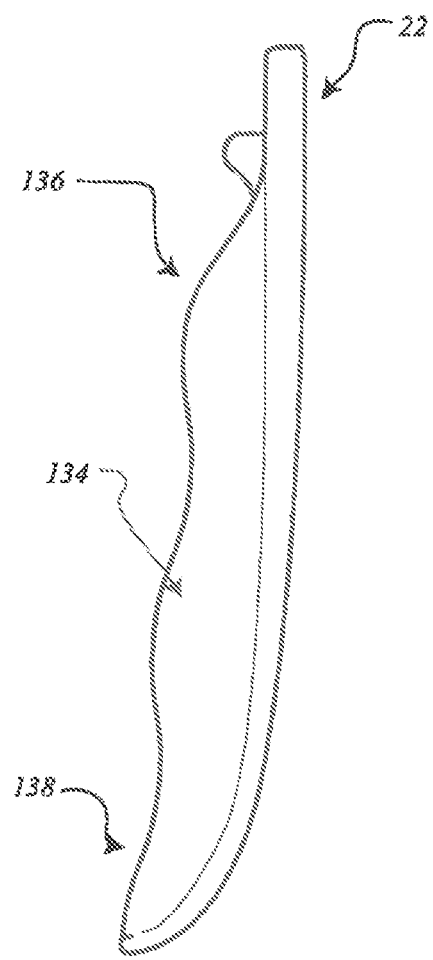
Figure 3D:
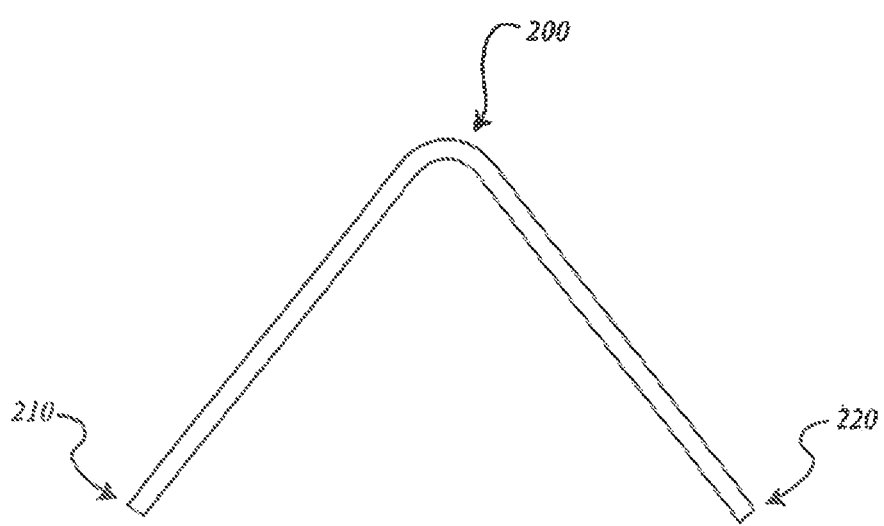
Figure 4A:
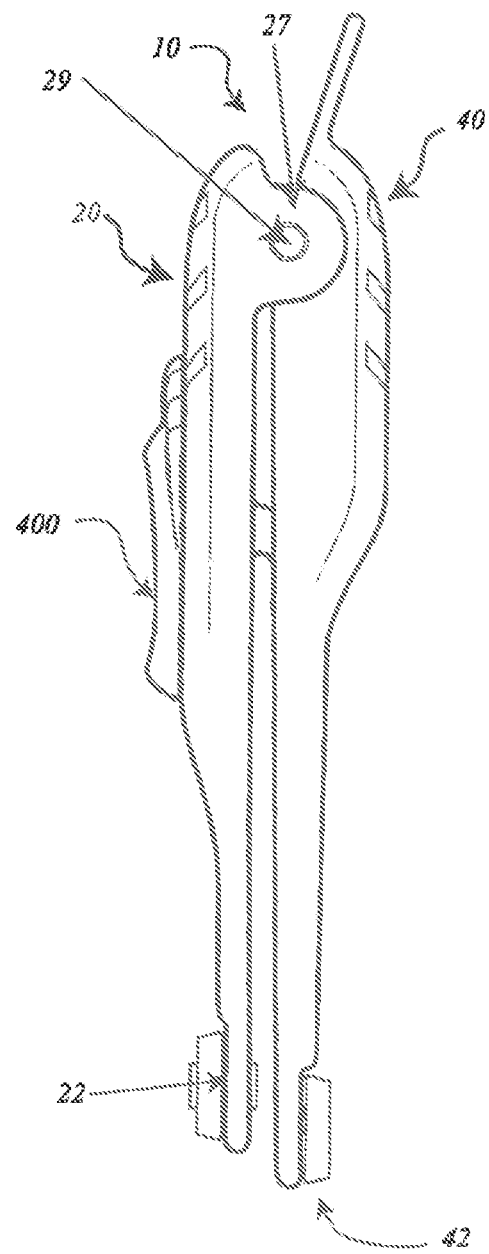
Figure 4B:
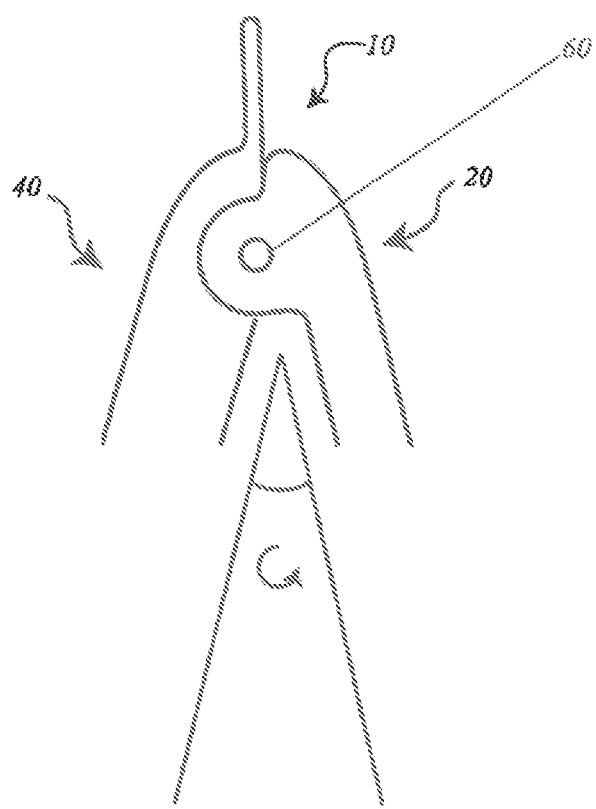
Figure 4C:
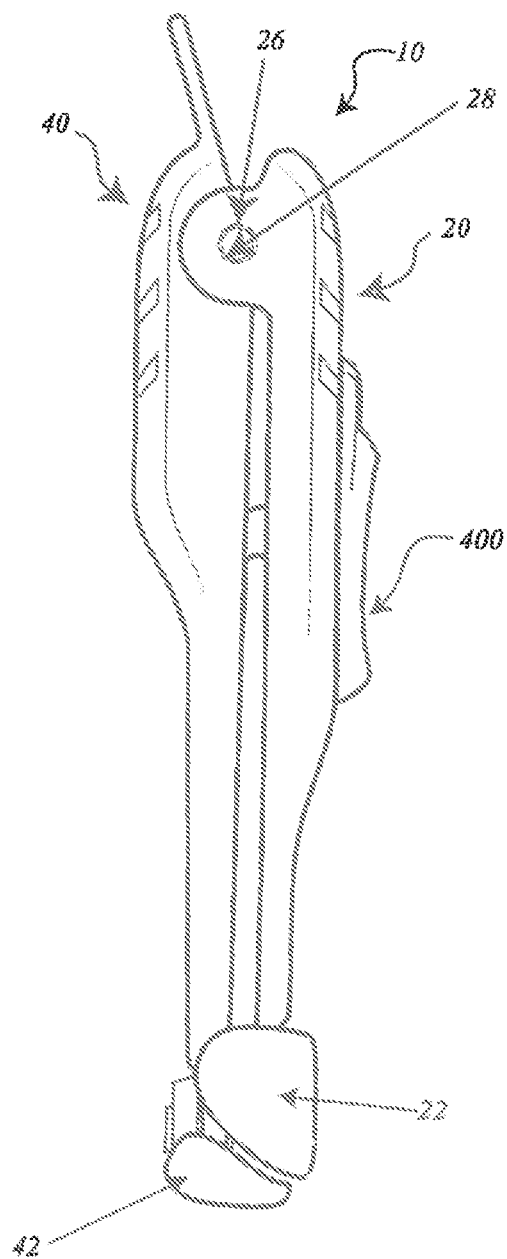
Figure 5A:
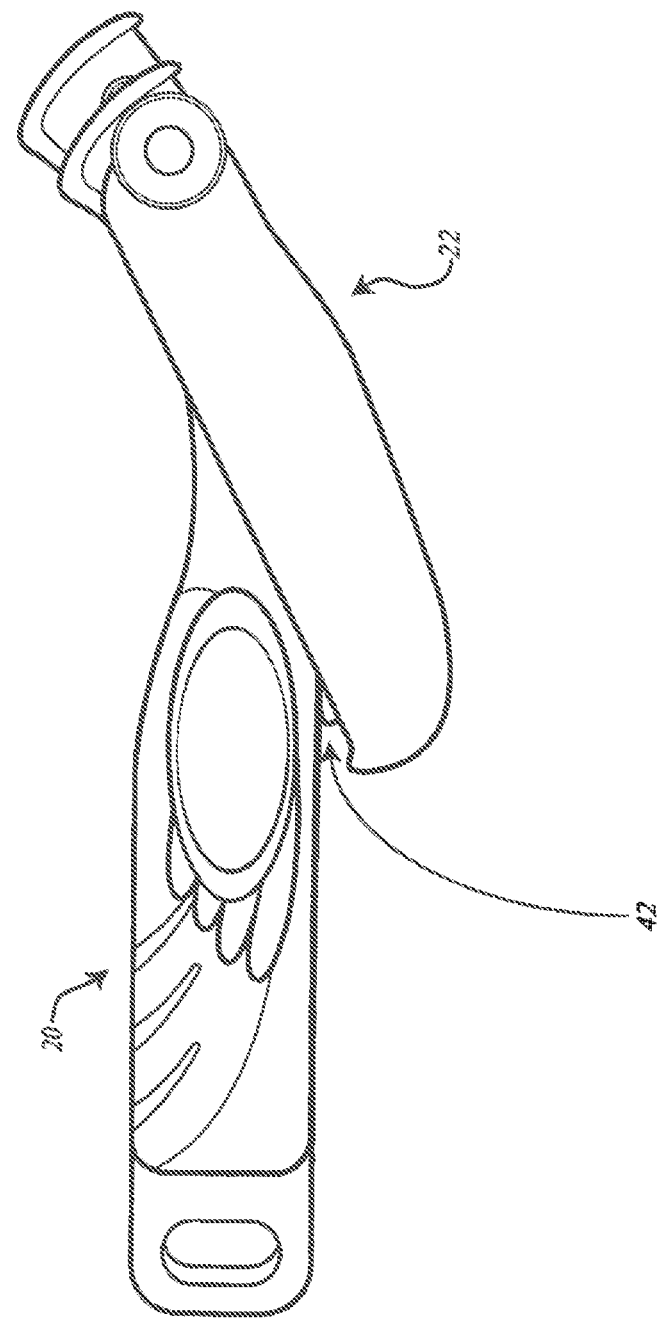
Figure 5B:
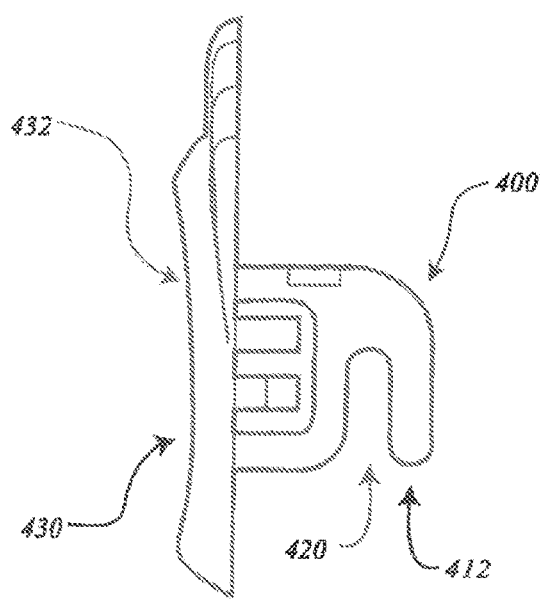
Figure 5C:
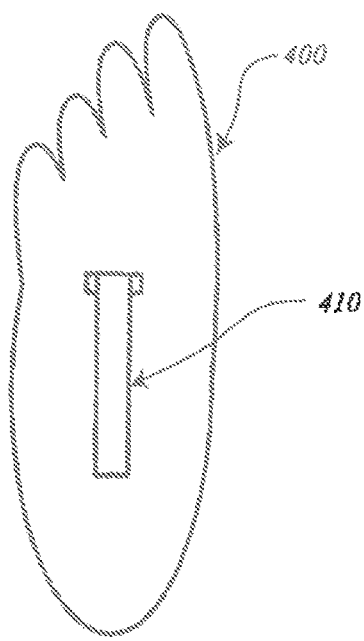
Figure 6:
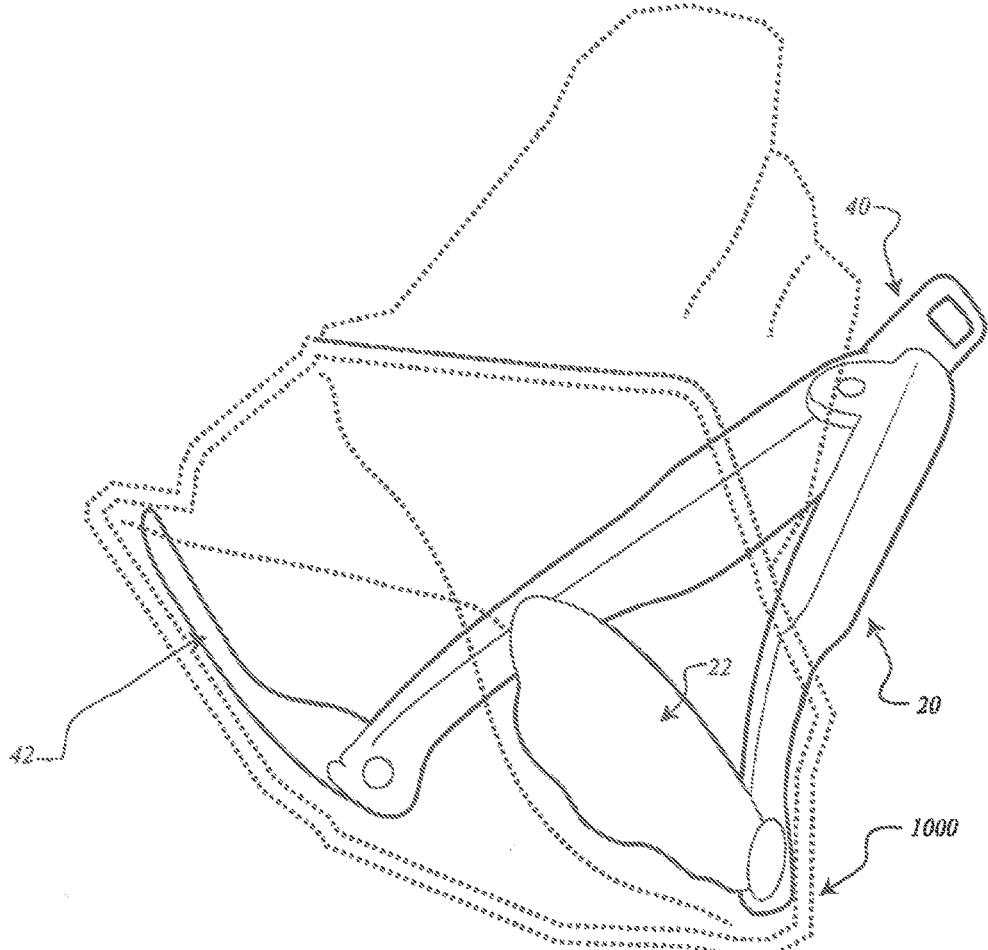
Figure 7:
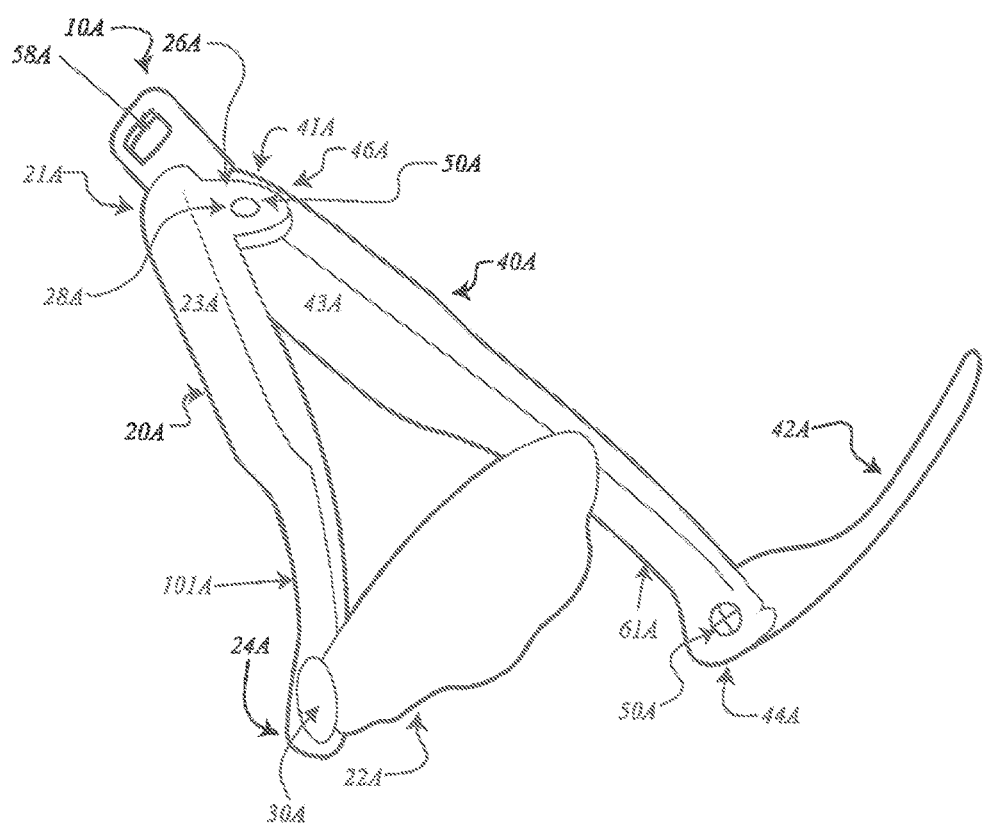
Figure 8A:
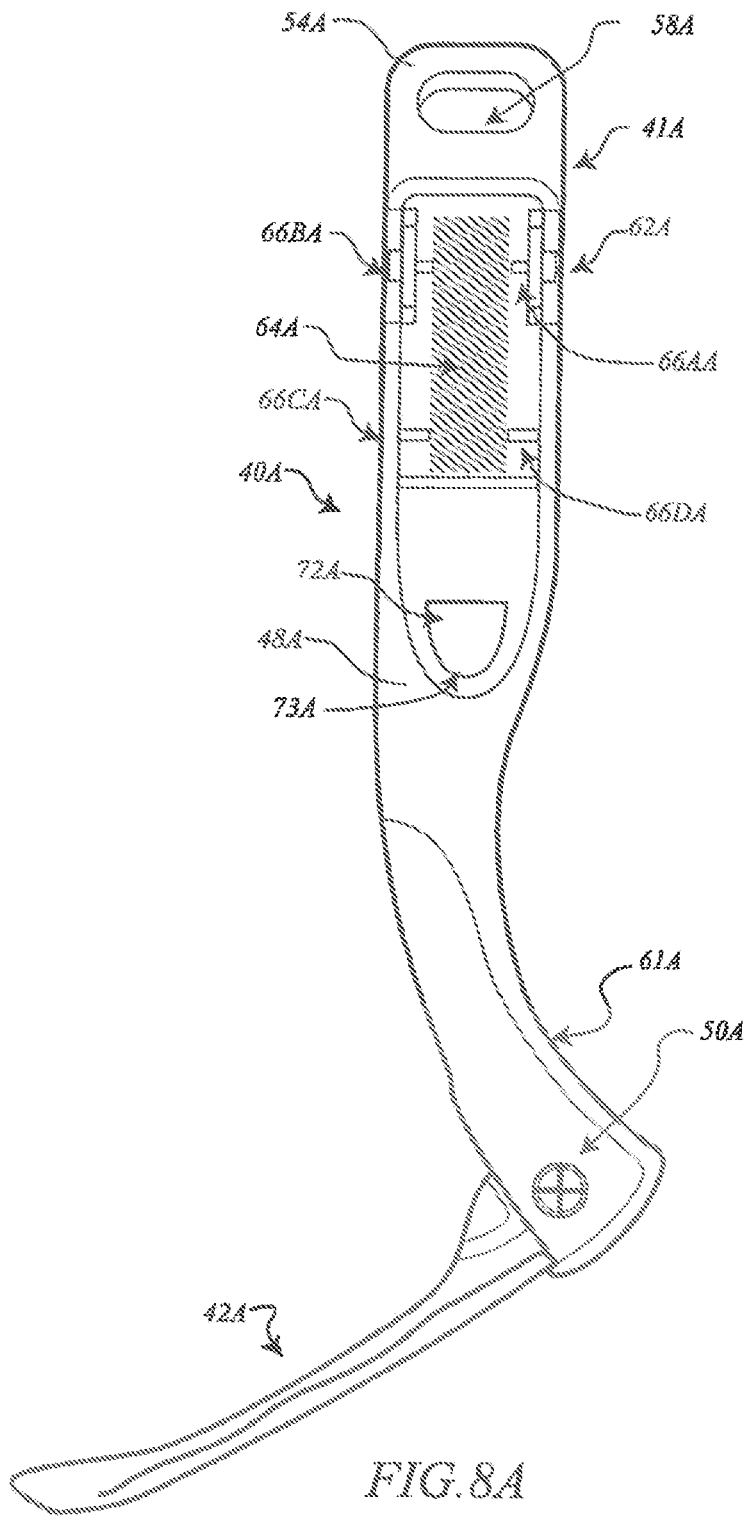
Figure 8B:
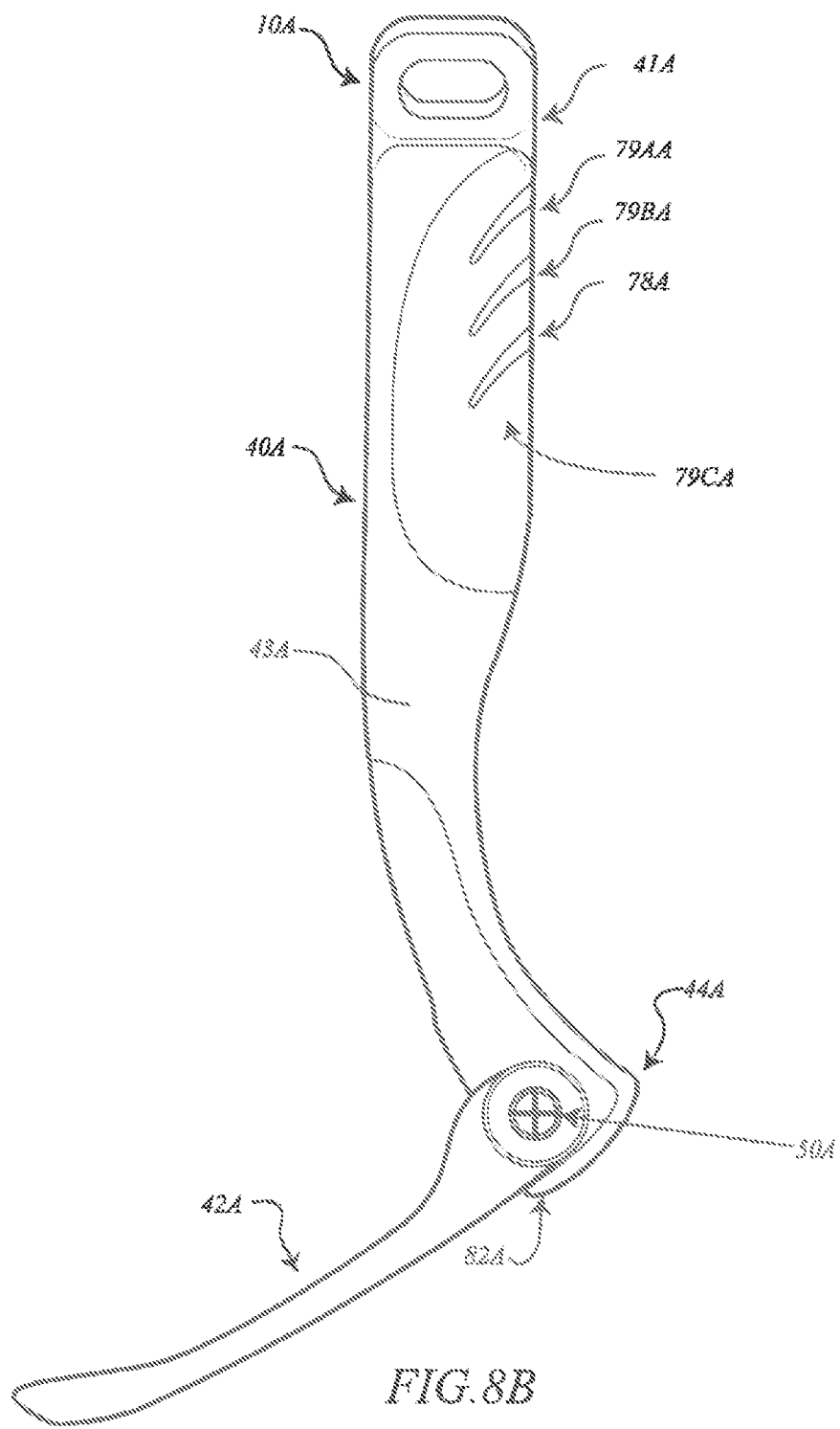
Figure 8C:
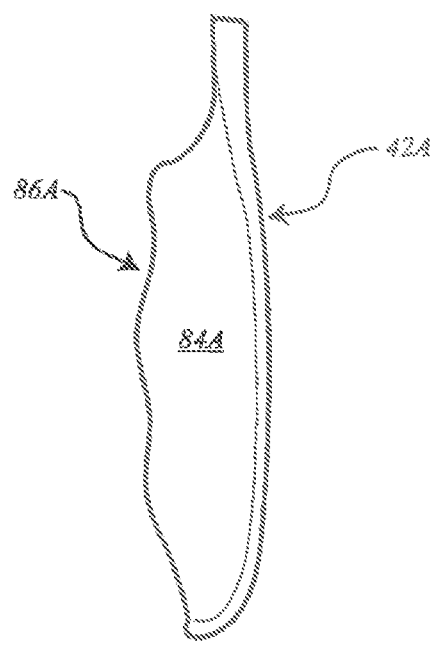
Figure 9A:
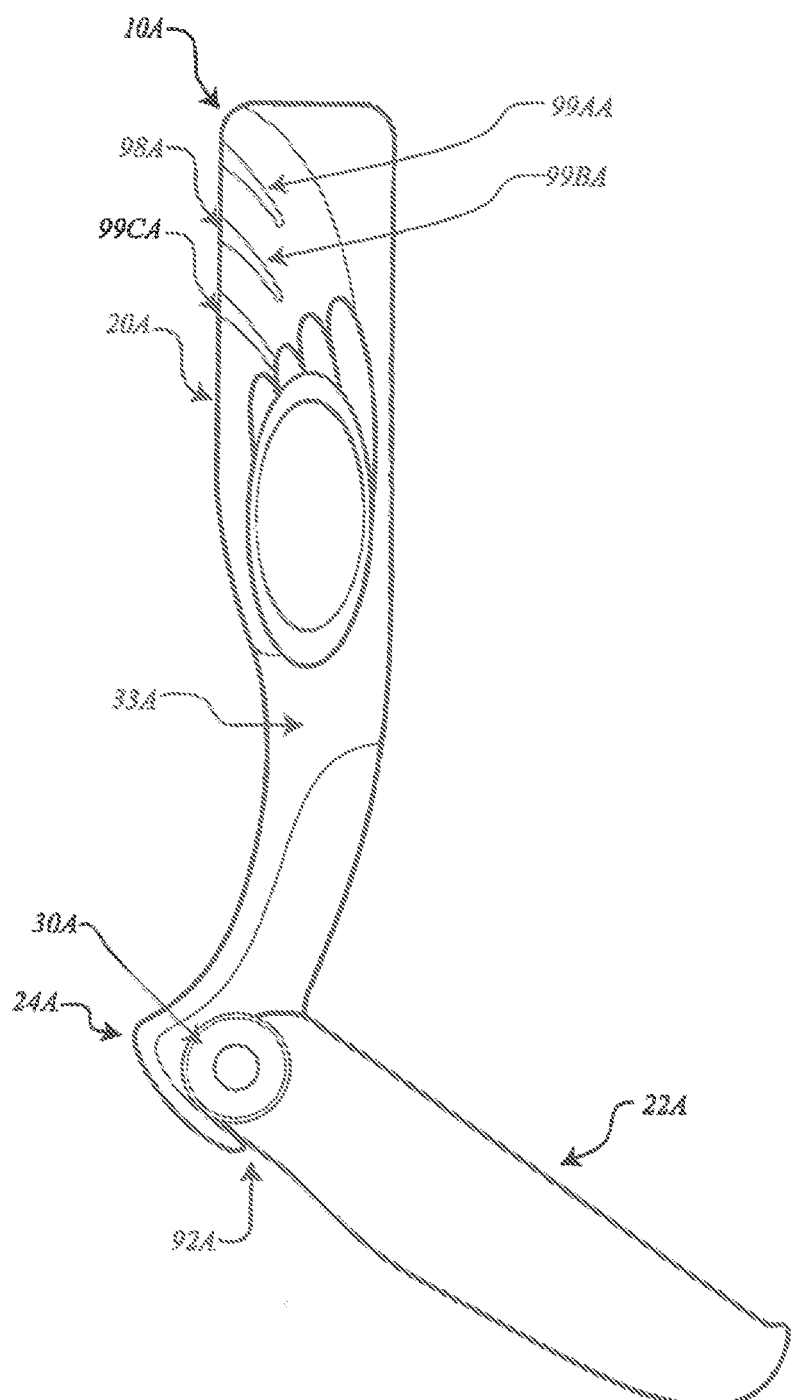
Figure 9B:
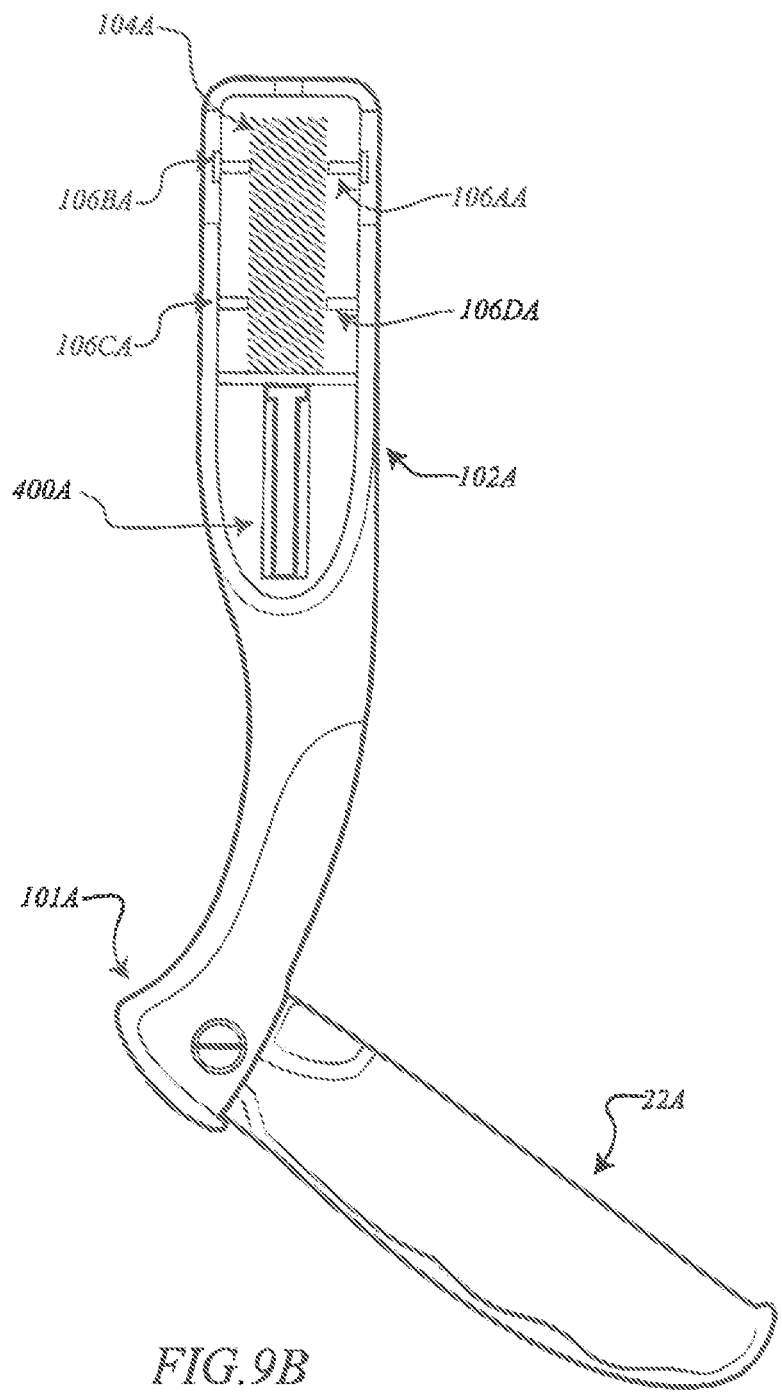
Figure 9C:
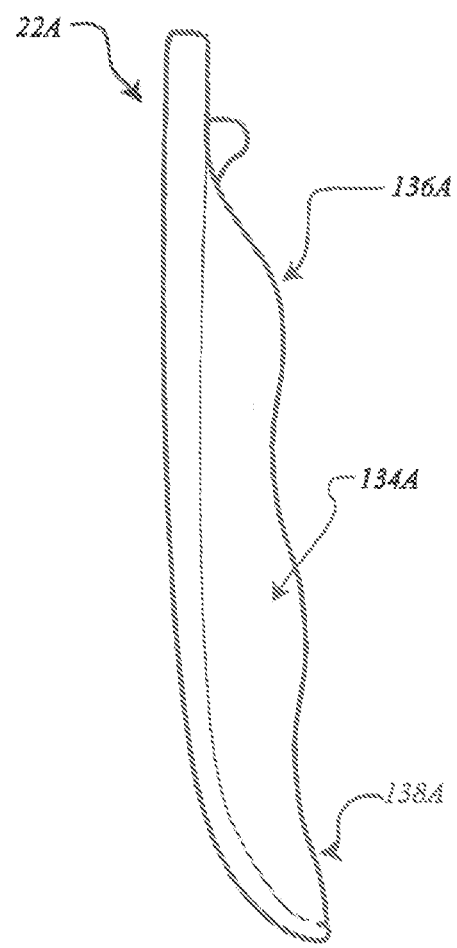
Figure 9D:
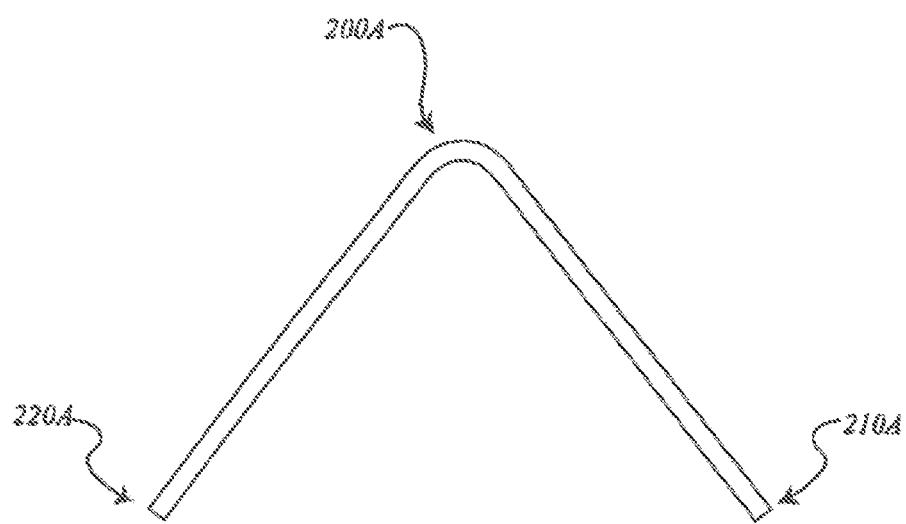
Figure 10A:
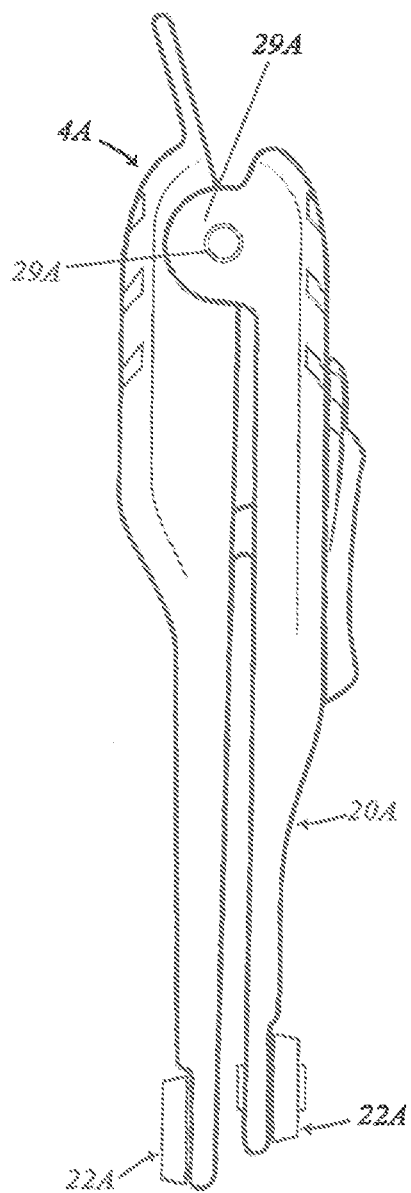
Figure 10B:
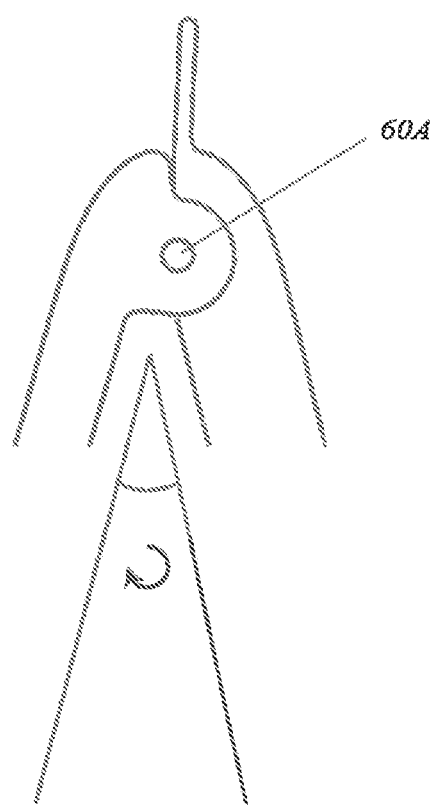
Figure 10C:
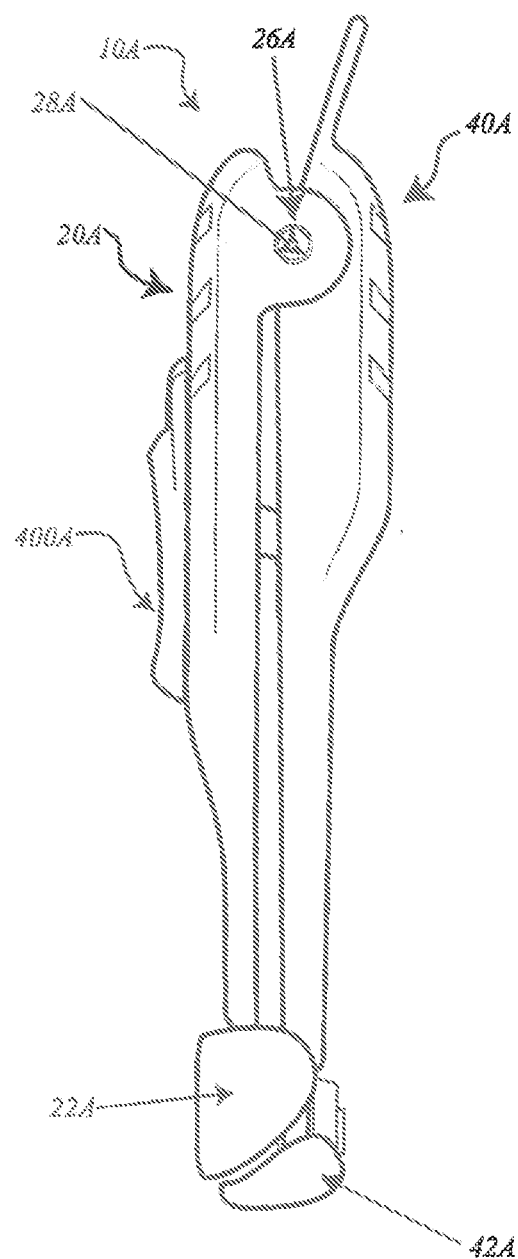
Figure 11A:
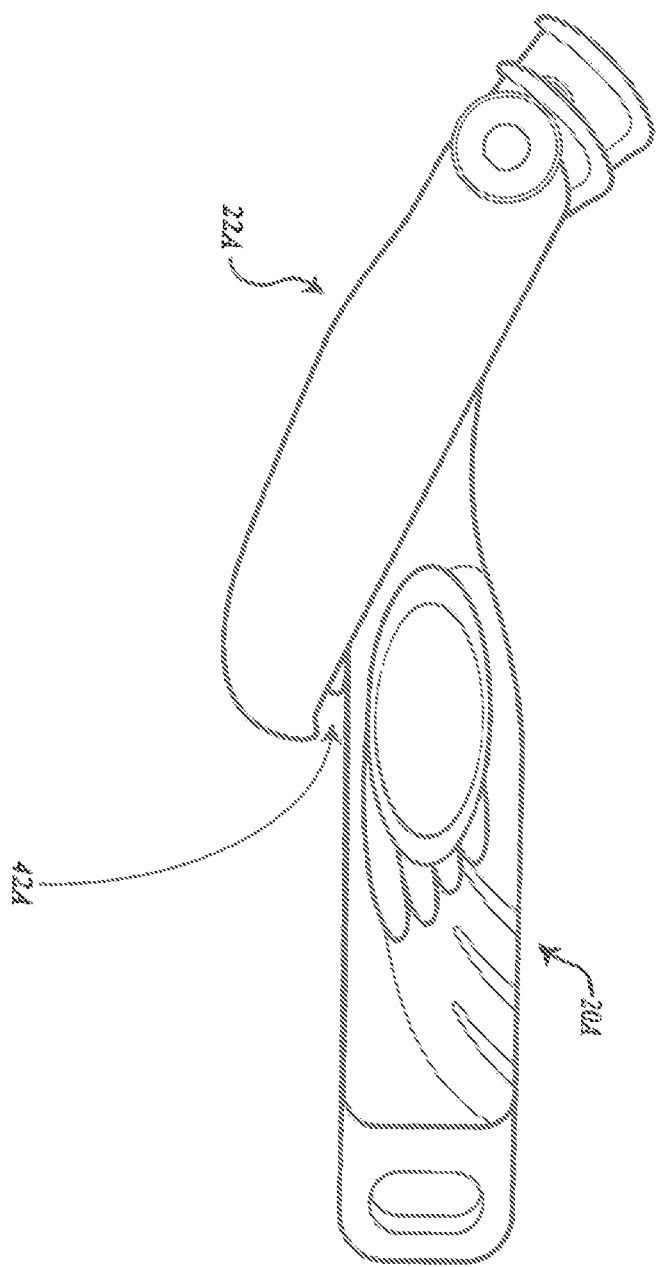
Figure 11B:
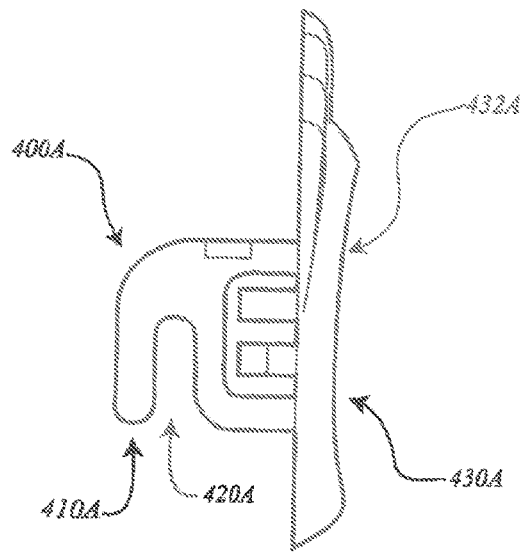
Figure 11C:
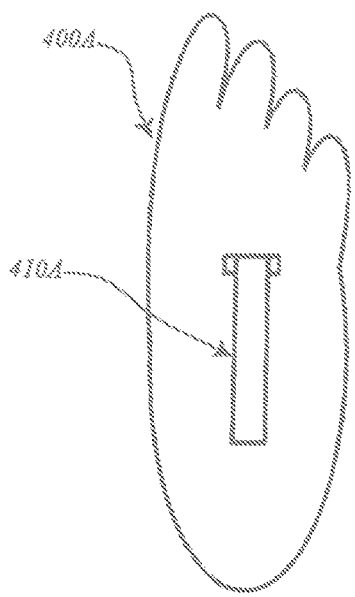
Figure 12:
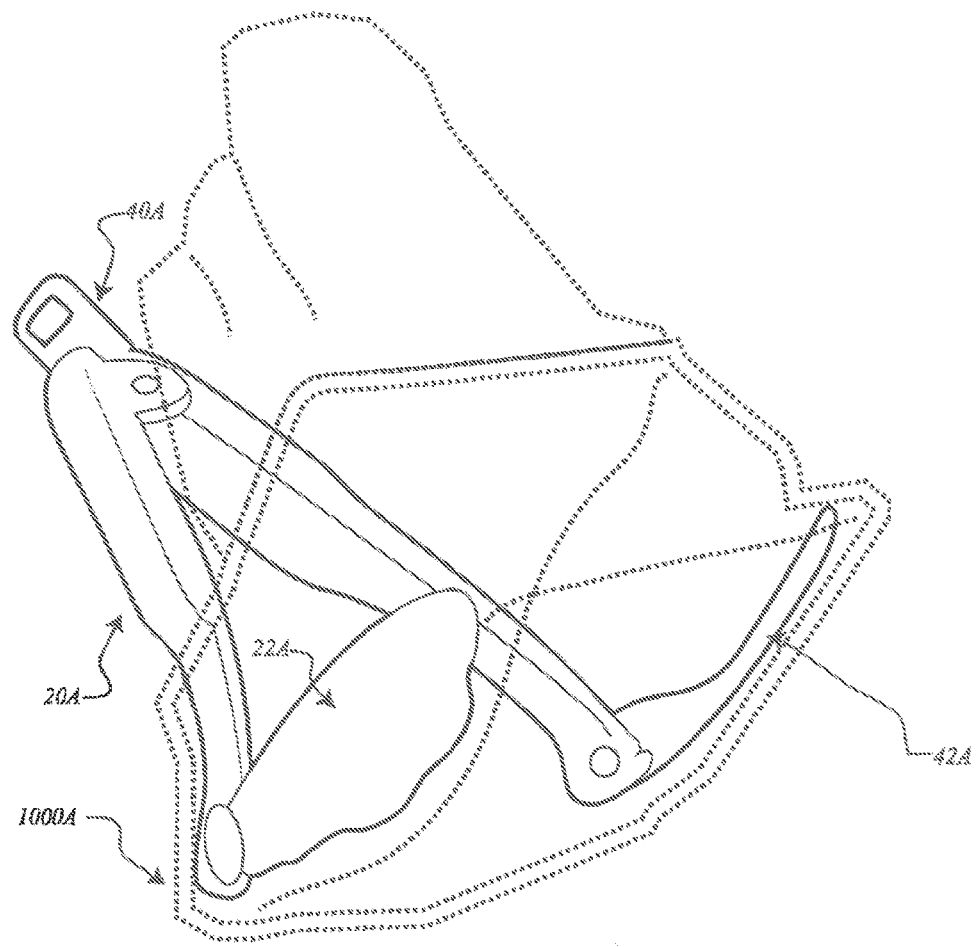

FIG. 1 is a front left side perspective view of the first embodiment of the present invention animal defecation collection apparatus;

FIG. 2A is an interior left side view of the right arm of the first embodiment of the present invention animal defecation collection apparatus illustrating the inside portion of the right arm, the view with the exterior surface removed and looking into the interior of the right arm when viewed from the right side;

FIG. 2B is an exterior right side view of the right arm of the first embodiment of the present invention animal defecation collection apparatus illustrating the outside portion of the right arm;

FIG. 2C is a top view of the right arm's dust pan blade; of the first embodiment of the present invention;

FIG. 3A is an exterior left side view of the left arm of the first embodiment of the present invention animal defecation collection apparatus illustrating the exterior portion of the left arm;

FIG. 3B is an interior left view of the left arm of the first embodiment of the present invention animal defecation collection apparatus illustrating the inside portion of the left arm; the view with the exterior surface removed and looking into the interior of the left arm when viewed from the left side;

FIG. 3C is a top view of the left arm's sweeper blade of the first embodiment of the present invention;

FIG. 3D is a rear view of the triangularly shaped leaf spring in an expanded condition of the first embodiment of the present invention;

FIG. 4A is a rear view of the present invention animal defecation collection apparatus in the closed condition with the right arm on the right side and the left arm on the left side, with its locking mechanism in use to close the apparatus with the sweeper blade and dust pan blade folded and out of view in the first embodiment of the present invention;

FIG. 4B is a close up front view of the upper portion of the first embodiment of the present invention animal defecation collection apparatus illustrating the angle between the left arm and the right arm when the animal defecation collection apparatus is in the open position;

FIG. 4C is a front view of the first embodiment of the present invention animal defecation collection apparatus in the closed condition with the right arm on the left side and the left arm on the right side, with its locking mechanism in use to close the apparatus with the sweeper blade and dust pan blade folded;

FIG. 5A is a left side view of the first embodiment of the present invention animal defecation collection apparatus illustrating the left arm and sweeper blade in the closed condition and also illustrating a small portion of the dust pan blade in the closed condition, also illustrating a portion of the upper end of the right arm extension;

FIG. 5B is a side view of the locking trigger removed from the left arm of the first embodiment of the present invention animal defecation collection apparatus;

FIG. 5C is a right side view of the locking trigger removed from the left arm of the first embodiment of the present invention animal defecation collection apparatus;

FIG. 6 is a front left side perspective view of the first embodiment of the present invention animal defecation collection apparatus illustrated in use with a plastic bag extended over the animal defecation collection apparatus;

The views in FIG. 7-12 are described from a point of view of a person holding the second embodiment of the present invention in the person's left hand as the person is looking from a right side, rear and top view of the present invention in front of the person;

FIG. 7 is a front right side perspective view of the second embodiment of the present invention animal defecation collection apparatus;

FIG. 8A is an interior right side view of the right arm of the second embodiment of present invention animal defecation collection apparatus illustrating the inside portion of the right arm, the view with the exterior surface removed and looking into the interior of the right arm when viewed from the left side;

FIG. 8B is an exterior right side view of the right arm of the second embodiment of the present invention animal defecation collection apparatus illustrating the outside portion of the right arm;

FIG. 8C is a top view of the right arm's dust pan blade of the second embodiment of the present invention;

FIG. 9A is an exterior right view of the left arm of the second embodiment of the present invention animal defecation collection apparatus illustrating the outside portion of the right arm;

FIG. 9B is an interior left side view of the left arm of the second embodiment present invention animal defecation collection apparatus illustrating the interior portion of the left arm, the view with the exterior surface removed and looking into the interior of the left arm when viewed from the left side;

FIG. 9C is a top view of the left arm's sweeper blade of the second embodiment of the present invention;

FIG. 9D is a rear view of the triangularly shaped leaf spring in an expanded condition of the second embodiment of the present invention;

FIG. 10A is a front view of the second embodiment of the present invention animal defecation collection apparatus in the closed condition with the left arm on the right side and the right arm on the left side, with its locking mechanism in use to close the apparatus with a sweeper blade and dust pan blade folded and out of view;

FIG. 10B is a close up rear view of the upper portion of the second embodiment of the present invention animal defecation collection apparatus illustrating the angle between the left arm and the right arm when the animal defecation collection apparatus is in the open position;

FIG. 10C is a rear view of the second embodiment of the present invention animal defecation collection apparatus in the closed condition with the right arm on the left side and the left arm on the right side, with its locking mechanism in use to close the apparatus with the sweeper blade and dust pan blade folded;

FIG. 11A is a right side view of the second embodiment of the present invention animal defecation collection apparatus illustrating the right arm and sweeper blade in the closed condition and also illustrating a small portion of the dust pan blade in the closed condition;

FIG. 11B is a side view of the locking trigger removed from the right arm of the second embodiment of the present invention animal defecation collection apparatus;

FIG. 11C is a left side view of the locking trigger removed from the right arm of the present invention animal defecation collection apparatus; and FIG. 12 is a front perspective view of the second embodiment of the present invention animal defecation collection apparatus illustrated in use with a plastic bag extended over the animal defecation collection apparatus.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

All figures and the related descriptions are prepared from the information supplied by the inventor. Therefore, all view are confirmed by the inventor. By way of example, when viewed from the side, scallops on the dustpan and sweeper are not visible.

Referring to FIG. 1, there is illustrated a front left side perspective view of the first embodiment of the present invention animal defecation collection apparatus 10, having a left arm 20 and a right arm 40. Left arm 20 has a left arm upper portion 23 with a left upper proximal end 21 having a vertical transverse left interconnecting wall 26 extending perpendicular to upper portion 23, the vertical transverse left interconnecting wall 26 having a centrally located circular opening 28. The left arm also has a spaced apart interconnecting wall 27 with an opening 29 aligned with the opening 28. These parts 27 and 29 are illustrated in FIG. 4A. Therefore, the left arm 20 includes walls 26 and 27 extending perpendicular to the upper portion from the left arm, the vertical transverse left interconnecting spaced apart walls 26 and 27 having aligned openings 28 and 29. Left arm 20 has a left distal end 24 having a lower left rotatable pivot connection 30 that connects left arm 20 to sweeper blade 22.

Similarly referring again to FIG. 1, the present invention animal defecation collection apparatus 10 has an opposite right arm 40. Right arm 40 has a right arm upper portion 43 with a right upper proximal end 41 having a right interconnecting wall 46 having a circular opening. The right interconnecting wall 46 is inserted between the spaced apart interconnecting walls 26 and 27. The opening (not shown) is aligned with openings 28 and 29 so that a pin can be inserted between all the holes to rotatably obtain left arm 20 and right arm 40 together. Right interconnecting wall 46 is sized and shaped to conform to transverse left interconnecting wall 26. Right arm 40 has a circular opening (not visible) aligned with circular opening 26. Left arm 20 and right arm 40 are connected at these centrally located circular openings by upper pin 60. Upper pin 60 also provides a means by which left arm 20 and right arm 40 rotate inwardly to sweep/grasp feces in to a collection bag (illustrated in FIG. 6) and rotate outwardly to enable feces to be removed. Right arm 40 has a right distal end 44 having a lower right rotatable pivot connection 50 that connects right arm 40 to dust pan blade 42.

Referring to FIG. 2A, there is illustrated is an interior left side view of the right arm of the present invention animal defecation collection apparatus illustrating the inside portion of the right arm 40 of the present invention animal defecation collection apparatus 10, the view with the exterior surface removed and looking into the interior of the right arm when viewed from the right side. Right arm 40 has a right arm upper portion 41 having an oval shaped cut out 58 near and just below right arm top end 54. Oval shaped cut out 58 is designed for storing the present invention animal defecation collection apparatus 10 on a hook or similar structure during storage. Right arm 40 has a right arm inner surface 48 that contains a right interior chamber 62 having a right leaf spring housing 64 containing four right retaining notches 66A, 66B, 66C, and 66D. The four right retaining notches 66A, 66B, 66C, and 66D which retain leaf spring 200 (illustrated in FIG. 3D) within right interior chamber 62 and positioned in the same location of right interior chamber 62 when the present invention animal defecation collection apparatus 10 is in use and transitioning from the closed condition illustrated in FIG. 4A to the open position illustrated in FIG. 1.

Further referring to FIG. 2A, there is illustrated trigger lock slot box 72 located near the lower portion of right interior chamber 62. Trigger lock slot box 72 receives trigger clip 400 (illustrated in FIG. 5B) to lock the present invention animal defecation collection apparatus 10 in the closed condition (illustrated in FIG. 4A) for storage or when not in use. Further illustrated in FIG. 2A is right curved portion 61 of right arm 40. Right curved portion 61 assists in keeping a feces collection bag (illustrated in FIG. 6) from falling down and retained in the same position during use. In addition, right curved portion 61 also performs the function of helping to keep the feces collection bag 1000 (illustrated in FIG. 6) open during use.

Referring to FIG. 2B, there is illustrated an exterior side view of the right arm 40 of the first embodiment of the present invention animal defecation collection apparatus 10 illustrating the outside portion of the right arm having a right arm outer surface 43-O. Near right arm upper portion 41 is right handle 78. Right handle 78 has right gripping members 79A, 79B, and 79C to allow the user to better grip the present invention animal defecation collection apparatus 10 during use. Right distal end 44 of right arm 40 has a right stopper 82 that prevents over rotation of dust pan blade 42 as dust pan blade 42 rotates about lower right rotatable pivot connection 50.

Referring to FIG. 2C, there is illustrated a top view of the right arm's dust pan blade 42 having a dust pan top surface 84 and a dust pan curved section 86 to allow improved scooping during the feces collection process over surfaces such as grass.

Referring to FIG. 3A there is illustrated an exterior left side view of the left arm 20 of the present invention animal defecation collection apparatus 10 having a left arm outer surface 33, a left handle 98, and left gripping members 99A, 99B, and 99C, a lower left rotatable pivot connection 30 that connects left arm 20 to sweeper blade 22. Also illustrated is left distal end 24 of left arm 20 having a left stopper 92 that prevents over rotation of sweeper blade 22 as sweeper blade 22 rotates about lower left rotatable pivot connection 30. falling down and retained in the same position during use. In addition, left curved portion 38 also performs the function of helping to keep the feces collection bag (illustrated in FIG. 6) open during use.

Referring to FIG. 3B, there is illustrated an interior view of the left arm 20 of the first embodiment of the present invention animal defecation collection apparatus 10, illustrating a trigger clip 400 located near the lower portion of left interior chamber 102. Trigger clip 400 (illustrated in FIG. 5B) locks the present invention animal defecation collection apparatus 10 by interlocking with trigger lock slot box 72 (illustrated in FIG. 2A) to retain left arm 20 and right arm 40 in the closed condition (illustrated in FIG. 4A) for storage or when not in use. Further illustrated in FIG. 3B is left curved portion 38 of left arm 20. Left curved portion 38 assists in keeping the feces collection bag from falling down and in the same position during use. Left curved portion 38 also performs the function of helping to keep the bag feces collection bag 1000 (illustrated in FIG. 6) open during use as well. Left interior chamber 102 also contains a left leaf spring housing 104 containing four left retaining notches 106A, 106B, 106C, and 106D. The four left retaining notches (106A, 106B, 106C, and 106D) retain leaf spring 200 (illustrated in FIG. 3D) within left interior chamber 102 and positioned in the same location of left interior chamber 102.

Referring to FIG. 3C, for the first embodiment of the present invention there is illustrated a top view of the left arm's sweeper blade 22 having a sweeper top surface 134 and a sweeper edge 136 with sweeper edge 136 having a multitude of sweeper scalloped or curved edges 138 that perform the function of assisting sweeper blade 22 collect or push feces along surfaces such as grass. Sweeper scalloped edges 138 allow the grass to fit into the grooves between curves or scallops more efficiently than a straight section and therefore improve the collection process during use of the present invention animal defecation collection apparatus 10.

Referring to FIGS. 2A, 3B, 3D, 4A, 4B, and 4C there is illustrated in FIG. 3D a rear view of the bent leaf spring 200 having an arcuate top section 205 with a left longitudinal side or left arm 210 and a right longitudinal side or right arm 220. Bent leaf spring 200 has a right longitudinal side 220 inserted into and retained by right retaining notches 66A, 66B, 66C and 66D of right leaf spring housing 64. Triangular shaped leaf spring 200 also has a left longitudinal side 210 inserted into and retained by left retaining notches 106A, 106B, 106C and 106D of left leaf spring housing 106.

Prior to use and not in the closed condition, bent leaf spring 200 extends left arm 20 and right arm 40 (illustrated in FIG. 4B) to an approximate starting angle θ between 30 degrees and 40 degrees when leaf spring 200 is in the non-compressed condition. When in the closed condition for storage as illustrated in FIG. 4A, triangular shaped leaf spring 200 is compressed to a position where leaf spring left arm 210 and leaf spring right arm 220 are adjacent or almost touching.

FIG. 4A is a rear view of the first embodiment of the present invention animal defecation collection apparatus 10 in the closed condition with the right arm 40 on the right side and the left arm 20 on the left side, with its locking mechanism in use to close the apparatus with the sweeper blade and dust pan blade folded and out of view.

FIG. 4B is a close up front view of the upper portion of the first embodiment of the present invention animal defecation collection apparatus illustrating the angle between the left arm 20 and the right arm 40 when the animal defecation collection apparatus is in the open position.

FIG. 4C is a front view of the first embodiment of the present invention animal defecation collection apparatus 10 in the closed condition with the right arm 40 on the left side and the left arm 20 on the right side, with its locking mechanism in use to close the apparatus with the sweeper blade 22 and dust pan blade 42 folded.

Further illustrated in FIG. 4A and FIG. 4C is trigger clip 400 which is used to retain left arm 20 and right arm 40 together during non use or in the storage condition.

FIG. 5A is a left side view of the of the first embodiment of the present invention animal defecation collection apparatus 10 illustrating the left arm 20 and sweeper blade 22 in the closed condition and also illustrating a small portion of the dustpan blade 42 in the closed condition.

FIG. 5B is a side view of the locking trigger 400 removed from the left arm 20 of the first embodiment of the present invention animal defecation collection apparatus 10.

FIG. 5C is a right side view of the locking trigger removed from the left arm of the the first embodiment of the present invention animal defecation collection apparatus.

Referring to FIG. 5A, there is illustrated a right view of the left arm 20 of the present invention animal defecation collection apparatus 10 illustrating sweeper blade 22 in the closed condition.

Referring to FIGS. 5B and 5C, there is illustrated trigger clip 400 having a locking member 410 that contains a protruding member 412 and similarly sized slot opening 420. Trigger clip 400 also has a trigger clip left surface 430 having a slight convex curvature surface 432 to better receive a user's thumb or finger to slide up and down for locking and unlocking trigger clip 400.

Referring to FIGS. 2A and 5B, protruding member 410 of trigger clip 400 fits inside of trigger lock slot box 72 wherein, slot opening 420 rests upon trigger slot bottom shelf 73 when trigger clip 400 is pressed downward by a user's thumb or finger and therefore securing left arm 20 and right arm 40 together.

Referring to FIG. 6, there is illustrated a front perspective view of the present invention animal defecation collection apparatus 10 in use with a plastic bag 1000 extended over the animal defecation collection apparatus 10. During operation a user places a plastic bag 1000 over the present invention animal defecation collection apparatus 10 and collects feces by squeezing the left arm 20 and right arm 40 together causing sweeper blade 22 and dust pan blade 42 to move from a position further apart to a position closer together and thereby causing the selected feces to be collected. The feces collection bag 1000 and animal defecation collection apparatus 10 are turned upside down. Once the left arm 20 and right arm 40 are slightly released, the force of leaf spring 200 causes left arm 20 and right arm 40 to open and thereby releasing the selected feces into feces collection bag 1000. The bag can be sealed up after collecting the feces or the bag can be reused by simply dropping the feces that was collected into another trash bag.

Referring to FIG. 7, there is illustrated a front right side perspective view of the second embodiment of the present invention animal defecation collection apparatus 10A having a right arm 20A and a left arm 40A. Right arm 20A has a right arm upper portion 23A with a right proximal end 21A having a vertical transverse right interconnecting wall 26A extending perpendicular to upper portion 23A. The vertical transverse right interconnecting wall 26A having a centrally located circular opening 28.A The right arm also has a spaced apart interconnecting wall 27A with an opening 29A aligned with the opening 28A. These parts 27A and 29A are illustrated in FIG. 10A. Therefore, the right arm 20A includes walls 26A and 27A extending perpendicular to the upper portion from the right arm 20A. The vertical transverse right interconnecting spaced apart walls 26A and 27A having aligned openings 28A and 29A. Right arm 20A has a right distal end 24A having a lower right rotatable pivot connection 30A that connects right arm 20A to sweeper blade 22A.

Similarly referring again to FIG. 7, the second embodiment of the present invention animal defecation collection apparatus 10A has an opposite left arm 40A. Left arm 40A has a left arm upper portion 43A with a left upper proximal end 41A having a left interconnecting wall 46A having a circular opening. The left interconnecting wall 46A is inserted between the spaced apart interconnecting walls 26A and 27A. The opening (not shown) is aligned with openings 28A and 29A so that a pin can be inserted between all the holes to rotatably obtain right arm 20A and left arm 40A together. Left interconnecting wall 46A is sized and shaped to conform to transverse right interconnecting wall 26A. Left arm 40A has a circular opening (not visible) aligned with circular opening 26A. Right arm 20A and left arm 40A are connected at these centrally located circular openings by upper pin 60A. Upper pin 60A also provides a means by which right arm 20A and left arm 40A rotate inwardly to sweep/grasp feces into a collection bag (illustrated in FIG. 6) and rotate outwardly to enable feces to be removed. Left arm 40A has a left distal end 44A having a lower left rotatable pivot connection 50A that connects left arm 40A to dust pan blade 42A.

Referring to FIG. 8A, there is illustrated is an interior left side view of the left arm of the second embodiment of the present invention animal defecation collection apparatus illustrating the inside portion of the left arm 40A of the second embodiment of the present invention animal defecation collection apparatus 10A, the view with the exterior surface removed and looking into the interior of the left arm when viewed from the left side. Left arm 40A has a left arm upper portion 41A having an oval shaped cut out 58A near and just below left arm top end 54A. Oval shaped cut out 58A is designed for storing the second embodiment of the present invention animal defecation collection apparatus 10A on a hook or similar structure during storage. Left arm 40A has a left arm inner surface 48A that contains a left interior chamber 62A having a left leaf spring housing 64A containing four left retaining notches 66AA, 66AB, 66AC, and 66AD. The four left retaining notches 66AA, 66AB, 66AC, and 66AD which retain leaf spring 200A (illustrated in FIG. 10D) within left interior chamber 62A and positioned in the same location of the left light interior chamber 62A when the second embodiment of the present invention animal defecation collection apparatus 10A is in use and transitioning from the closed condition illustrated in FIG. 10A to the open position illustrated in FIG. 7.

Further referring to FIG. 8A, there is illustrated trigger lock slot box 72A located near the lower portion of left interior chamber 62A. Trigger lock slot box 72A receives trigger clip 400A (illustrated in FIG. 11B) to lock the second embodiment of the present invention animal defecation collection apparatus 10A in the closed condition (illustrated in FIG. 10A) for storage or when not in use. Further illustrated in FIG. 8A is left curved portion 61A of left arm 40R. Left curved portion 61A assists in keeping a feces collection bag (illustrated in FIG. 6A) from falling down and retained in the same position during use. In addition, left curved portion 61A also performs the function of helping to keep the feces collection bag 1000A (illustrated in FIG. 12) open during use.

Referring to FIG. 8B, there is illustrated an exterior side view of the left arm 40A of the present invention animal defecation collection apparatus 10A illustrating the outside portion of the left arm having a left arm outer surface 43-OA. Near left arm upper portion 41A is left handle 78A. Left handle 78A has left gripping members 79AA, 79AB, and 79AC to allow the user to better grip the present invention animal defecation collection apparatus 10A during use. Left distal end 44A of left arm 40A has a left stopper 82A that prevents over rotation of dust pan blade 42A as dust pan blade 42A rotates about lower left rotatable pivot connection 50A.

Referring to FIG. 8C, there is illustrated a top view of the left arm's dust pan blade 42A having a dust pan top surface 84A and a dust pan curved section 86A to allow improved scooping during the feces collection process over surfaces such as grass.

Referring to FIG. 9A there is illustrated an exterior side view of the right arm 20A of the present invention animal defecation collection apparatus 10A right gripping members 99AA, 99AB, and 99AC, a lower right rotatable pivot connection 30A that connects right arm 20A to sweeper blade 22A. Also illustrated is a right distal end 24A of right arm 20A having a right stopper 92A that prevents over rotation of sweeper blade 22A as sweeper blade 22A rotates about lower right rotatable pivot connection 30A and prevented from falling down and retained in the same position during use. In addition, right curved portion 38A also performs the function of helping to keep the feces collection bag 1000A (illustrated in FIG. 12) open during use.

Referring to FIG. 9B, there is illustrated an interior view of the right arm 20A of the present invention animal defecation collection apparatus 10A, illustrating a trigger clip 400A located near the lower portion of right interior chamber 102A. Trigger clip 400A (illustrated in FIG. 11B) locks the present invention animal defecation collection apparatus 10A by interlocking with trigger lock slot box 72A (illustrated in FIG. 8A) to retain right arm 20A and left arm 40A in the closed condition (illustrated in FIG. 10A) for storage or when not in use. Further illustrated in FIG. 9B is right curved portion 38A of right arm 20.A Right curved portion 38A assists in keeping the feces collection bag from falling down and in the same position during use. Right curved portion 38A also performs the function of helping to keep the bag feces collection bag 1000A (illustrated in FIG. 12) open during use as well. Right interior chamber 102A also contains a right leaf spring housing 104A containing four right retaining notches 106AA, 106AB, 106AC, and 106AD. The four right retaining notches (106AA, 106AB, 106AC, and 106AD) retain leaf spring 200AD (illustrated in FIG. 8D) within right interior chamber 102A and positioned in the same location of left interior chamber 102.

Referring to FIG. 9C, there is illustrated a top view of the right arm's sweeper blade 22A having a sweeper top surface 134A and a sweeper edge 136A with sweeper edge 136A having a multitude of sweeper scalloped or curved edges 138A that perform the function of assisting sweeper blade 22A collect or push feces along surfaces such as grass. Sweeper scalloped edges 138A allow the grass to fit into the grooves between curves or scallops more efficiently than a straight section and therefore improve the collection process during use of the present invention animal defecation collection apparatus 10A.

Referring to FIGS. 8A, 9B, 9D, 10A, 10B, and 10C there is illustrated in FIG. 9D a rear view of the bent leaf spring 200A having an arcuate top section 205A with a right longitudinal side or right arm 210A and a left longitudinal side or left arm 220A. Bent leaf spring 200A has a left longitudinal side 220A inserted into and retained by left retaining notches 66AA, 66AB, 66AC and 66AD of left leaf spring housing 64A. Triangular shaped leaf spring 200A also has a right longitudinal side 210A inserted into and retained by right retaining notches 106A, 106B, 106C and 106D of left leaf spring housing 106A.

Prior to use and not in the closed condition, bent leaf spring 200A extends left arm 40A and right arm 20A (illustrated in FIG. 10B) to an approximate starting angle θ between 30 degrees and 40 degrees when leaf spring 200A is in the non-compressed condition. When in the closed condition for storage as illustrated in FIG. 10A, triangular shaped leaf spring 200A is compressed to a position where leaf spring left arm 210A and leaf spring right arm 220A are adjacent or almost touching.

FIG. 10A is a rear view of the present invention animal defecation collection apparatus 10 in the closed condition with the left arm 40A on the left side and the right arm 20A on the right side, with its locking mechanism in use to close the apparatus with the sweeper blade and dust pan blade folded and out of view.

FIG. 10B is a close up front view of the upper portion of the present invention animal defecation collection apparatus illustrating the angle between the left arm 40A and the right arm 20A when the animal defecation collection apparatus is in the open position.

FIG. 10C is a front view of the present invention animal defecation collection apparatus 10A in the closed condition with the left arm 40A on the left side and the right arm 20A on the right side, with its locking mechanism in use to close the apparatus with the sweeper blade 22A and dust pan blade 42A folded.

Further illustrated in FIG. 10A and FIG. 10C is trigger clip 400A which is used to retain left arm 40A and right arm 20A together during non use or in the storage condition.

FIG. 11A is a left side view of the present invention animal defecation collection apparatus 10A illustrating the right arm 20A and sweeper blade 22A in the closed condition and also illustrating a small portion of the dustpan blade 42A in the closed condition.

FIG. 11B is a side view of the locking trigger 400A removed from the right arm 20A of the present invention animal defecation collection apparatus 10A.

FIG. 11C is a right side view of the locking trigger removed from the left arm of the present invention animal defecation collection apparatus.

Trigger clip 400A having a locking member 410A that contains a protruding member 412A and similarly sized slot opening 420A. Trigger clip 400A also has a trigger clip right surface 430A having a slight convex curvature surface 432A to better receive a user's thumb or finger to slide up and down for locking and unlocking trigger clip 400A.

Referring to FIGS. 8A and 11B, protruding member 410A of trigger clip 400A fits inside of trigger lock slot box 72A wherein, slot opening 420A rests upon trigger slot bottom shelf 73A when trigger clip 400A is pressed downward by a user's thumb or finger and therefore securing right arm 20A and left arm 40A together.

Referring to FIG. 12, there is illustrated a front perspective view of the present invention animal defecation collection apparatus 10A in use with a plastic bag 1000A extended over the animal defecation collection apparatus 10A. During operation a user places a plastic bag 1000A over the present invention animal defecation collection apparatus 10A and collects feces by squeezing the left arm 40A and right arm 20A together causing sweeper blade 22A and dust pan blade 42A to move from a position further apart to a position closer together and thereby causing the selected feces to be collected. The feces collection bag 1000A and animal defecation collection apparatus 10A are turned upside down. Once the left arm 20A and right arm 40A are slightly released, the force of leaf spring 200A causes left arm 40A and right arm 20A to open and thereby releasing the selected feces into feces collection bag 1000A. The bag can be sealed up after collecting the feces or the bag can be reused by simply dropping the feces that was collected into another trash bag.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus for the collection of animal feces, the apparatus comprising:
   a. a left arm including a left arm upper portion with a left upper proximal end having a vertical transverse left interconnecting spaced apart walls extending perpendicular to the upper portion, the vertical transverse left interconnecting spaced apart walls having aligned centrally located openings, the left arm including a left distal end having a lower left rotatable pivot connection that connects the left arm to a sweeper blade having a scalloped interior surface, the left arm including an exterior curved portion adjacent the distal end;
   b. a right arm including a right arm upper portion with a right upper proximal end having a vertical transverse right interconnecting wall extending between the left interconnecting spaced apart walls, the vertical right interconnecting wall having an opening aligned with the openings in the spaced apart left interconnecting walls, a connecting pin extending through the aligned openings to rotatable connect the left arm to the right arm, the right arm including a right distal end having a lower right rotatable pivot connection that connects the right arm to a dustpan blade having a scalloped interior surface, the right arm including an exterior curved portion adjacent the distal end, the right arm including an upper portion extending above the vertical right interconnecting wall with the upper portion including a transverse opening;
   c. a bent leaf spring having an arcuate top section with a left longitudinal side arm and a right longitudinal side arm, a trigger locking member having protruding locking member with a slot opening and an exterior curved surface;
   d. the right arm including a right arm inner surface having a right interior chamber with a right leaf spring housing having a multiplicity of right retaining notches which retain the right arm of the bent leaf spring, the right arm including a trigger lock slot box located near a lower portion of right interior chamber, the trigger lock slot box receiving the protruding member of the trigger clip, the right arm an outer surface including a right handle with gripping members, a dustpan blade over rotation stopper on the exterior surface located at the distal end; and
   e. the left arm including a left arm inner surface having a left interior chamber with a left leaf spring housing having a multiplicity of left retaining notches which retain the left arm of the bent leaf spring, the protruding member of trigger clip portion extending into the interior surface and aligned with the right arm trigger lock slot box, the left arm having an outer surface including an exterior surface of the trigger clip movably retained on the exterior surface, a left handle with gripping members, a sweeper blade over rotation stopper on the exterior surface located at the distal end.

2. An apparatus for the collection of animal feces, the apparatus comprising:

a. a right arm including a right arm upper portion with a right upper proximal end having a vertical transverse right interconnecting spaced apart walls extending perpendicular to the upper portion, the vertical transverse right interconnecting spaced apart walls having aligned centrally located openings, the right arm including a right distal end having a lower right rotatable pivot connection that connects the right arm to a sweeper blade having a scalloped interior surface, the right arm including an exterior curved portion adjacent the distal end;

b. a left arm including a right arm upper portion with a left upper proximal end having a vertical transverse left interconnecting wall extending between the left interconnecting spaced apart walls, the vertical left interconnecting wall having an opening aligned with the openings in the spaced apart left interconnecting walls, a connecting pin extending through the aligned openings to rotatable connect the left arm to the right arm, the left arm including a left distal end having a lower left rotatable pivot connection that connects the left arm to a dustpan blade having a scalloped interior surface, the right arm including an exterior curved portion adjacent the distal end, the left arm including an upper portion extending above the vertical right interconnecting wall with the upper portion including a transverse opening;

c. a bent leaf spring having an arcuate top section with a left longitudinal side arm and a left longitudinal side arm, a trigger locking member having protruding locking member with a slot opening and an exterior curved surface;

d. the left arm including a right arm inner surface having a left interior chamber with a left leaf spring housing having a multiplicity of left retaining notches which retain the left arm of the bent leaf spring, the left arm including a trigger lock slot box located near a lower portion of left interior chamber, the trigger lock slot box receiving the protruding member of the trigger clip, the left arm an outer surface including a left handle with gripping members, a dustpan blade over rotation stopper on the exterior surface located at the distal end; and e. the right arm including a right arm inner surface having a right interior chamber with a right leaf spring housing having a multiplicity of right retaining notches which retain the right arm of the bent leaf spring, the protruding member of trigger clip portion extending into the interior surface and aligned with the right arm trigger lock slot box, the right arm having an outer surface including an exterior surface of the trigger clip movably retained on the exterior surface, a right handle with gripping members, a sweeper blade over rotation stopper on the exterior surface located at the distal end.

\* \* \* \* \*